United States Patent Office 2,813,879
Patented Nov. 19, 1957

2,813,879

REDUCTION OF 5,7-UNSATURATED STEROLS

Bernard S. Wildi and Elmar Altwicker, Dayton, Ohio, assignors to Monsanto Chemical Company, St. Louis, Mo., a corporation of Delaware No Drawing. Application May 20, 1953,
Serial No. 356,314

14 Claims. (Cl. 260—397.2)

This invention relates to the catalytic reduction of 5,7-unsaturated sterols to form the corresponding 5-allo-dihydro derivatives. In a specific aspect the invention relates to a shortening of the time required to effect the hydrogenation in the presence of a palladium catalyst of 5,7-unsaturated sterols to the 5-allo-dihydro derivatives.

The present invention is concerned, in one of its aspects, with the following reaction:

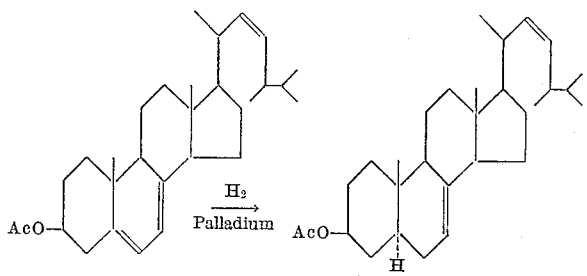

More broadly, the invention is concerned with the corresponding reduction of any 5,7-unsaturated sterol. By way of further examples of 5,7-unsaturated sterols that can be selectively reduced, in accordance with the invention, to the corresponding 5-allo-dihydro derivative, can be mentioned $\Delta^{5,7}$-cholestadiene (also called 7-dehydrocholestene), $\Delta^{5,7}$-stigmastadiene (also called 7-dehydrostigmasterol), sapogenins such as 7-dehydrodiosgenin, 7-dehydrositosterols, and the like. It will be understood that hydroxy groups in the sterols will be protected, during the hydrogenation, by esterification, as with acetic acid or any other suitable acid (used in the form of the acid anhydride to effect the esterification), so that the reduction is actually carried out on the acyloxy derivative, for example, the propionate, benzoate, succinate, acetate, etc. It has long been known in the art to effect the reduction of the double bond in the 5-position in such compounds by the action of hydrogen, at low pressures in the neighborhood of atmospheric pressure, with the use of catalysts such as palladium on activated charcoal. The present invention enables such reductions to be effected in a much shorter period of time than heretofore possible, but without loss in selectivity of the reaction. The double bond in the 7-position remains in the product.

In accordance with this invention, reductions of the type described are effected in the presence of an added small amount of a basic organic amine, which accelerates the reaction rate. The amine can be aliphatic, alicyclic, aromatic, or heterocyclic, so long as it is of the basic type. Some amines are too acidic in nature to be suitable, for example aniline has hydrogen atoms that can react acidically and is not suitable. It is preferred to employ amines that have dissociation constants (K) greater than $10^{-10}$. The existence of an amino group in an organic compound is not assurance of itself that the compound will be basic-reacting, in the sense used herein. Organic nitrogen compounds having dissociation constants between $10^{-10}$ and $10^{-3}$ are effective, and those with dissociation constants in the range of $10^{-6}$ to $10^{-4}$ are often preferred. Thus, aniline (K$4.6\times10^{-10}$), the amino acids, acetamide (K$3.1\times10^{-15}$), etc. are not suitable. Pyridine (K$2.3\times10^{-9}$)

is useful and during the course of the reaction is itself hydrogenated to piperidine which has an even higher dissociation constant. Therefore, pyridine can be considered as one way of supplying piperidine to the system. Piperidine is a preferred amine to employ in the practice of the invention. Other suitable amines include ethylenediamine, the alkanol amines (e. g., triethanolamine, propanolamine, etc.), the alkyl amines (e. g., the mono-, di- and tri- methyl, ethyl, propyl, butyl, amyl, etc. amines), α-picoline, 2-methyl-5-ethylpyridine, triethylene tetramine, morpholine. Numerous others will occur to those skilled in the art in view of the present disclosure. It is preferred to employ amines of not too great molecular weight, for example aliphatic amines containing up to about 10 carbon atoms are usually preferred to those having a higher number of carbon atoms.

Only sufficient amine need be employed to enhance the rate of reaction. This amount will not ordinarily exceed 10 weight percent of 5,7-unsaturated sterol being subjected to reduction, and quantities below 5 weight percent are ordinarily satisfactory. In most instances from 1 to 2 weight percent amine, based on the 5,7-unsaturated sterol, is sufficient to give a marked increase in the rate of the reduction reaction.

The usual reaction conditions and solvents can be employed, and these are well known to the art. Any organic solvent capable of dissolving the sterol to be hydrogenated can be employed. Among these can be mentioned ethyl acetate, ethyl alcohol, methyl alcohol, benzene, and mixtures of same. The reduction proceeds satisfactorily at room temperature. Temperatures within the range of 15° C. to 50° C. are generally permissible. The hydrogen pressure should not be great, else the selective nature of the reduction of the double bond at the 5-position will be lost. Hydrogen pressures of from 1 to 2 atmospheres are quite satisfactory. The reduction will take place at pressures below 1 atmosphere, but use of such sub-atmospheric pressures is not ordinarily convenient.

Any palladium catalyst capable of effecting the desired reduction can be employed. The palladium should be on a high surface area adsorptive substrate, e. g., activated charcoal. A suitable catalyst can be prepared by depositing from 1 to 5 weight percent palladium on activated charcoal. Suitable catalysts are obtainable commercially, from Baker & Company and others. A suitable quantity of catalyst will readily be chosen by one skilled in the art. For example, from 1 to 20 parts catalyst by weight per 100 parts sterol is satisfactory.

It is preferred to employ only sufficient solvent to obtain satisfactory solution of the 5,7-unsaturated sterol starting material and the resulting 5-dihydrosterol product, although a quantity of solvent in excess of that needed for effecting the solution is of course permissible. However, the use of excess solvent tends to slow the reaction and increases the cost of solvent removal and recovery.

The reaction time is limited to that required for the absorption of 1 mole equivalent of hydrogen per mole of 5,7-unsaturated sterol charged to the reaction. The course of the hydrogenation is easily determined by observing the change in pressure of the hydrogen gas or change in volume thereof. The reaction should be stopped when 1 mole equivalent of hydrogen per mole of sterol has been taken up. This results in the highly selective reduction of the double bond at the 5-position.

Any suitable apparatus can be used that results in intimate admixture of hydrogen, sterol, palladium catalyst, amine and solvent. Ordinarily providing a hydrogen atmosphere at about 1 to 2 atmospheres pressure, and vigorously agitating the liquid reaction mixture is sufficient. The necessary agitation can be obtained by shaking or by stirring. If desired, hydrogen gas can be bubbled through the reaction mixture.

The following examples illustrate suitable conditions and proportions of materials for effecting the invention as applied to ergosteryl acetate. It will be understood that variations in sterol, solvent, amine, and the various reaction conditions can be employed without departing from the invention.

EXAMPLES

Ergosteryl acetate was subjected to selective reduction of the double bond in the 5-position by hydrogenation in the presence of a palladium on activated charcoal catalyst containing 5 weight percent palladium. The reductions were effected by maintaining an atmosphere of hydrogen at slightly greater than atmospheric pressure over the liquid reaction mixture in a closed glass system. The liquid was vigorously stirred by a magnetic stirrer. Hydrogen was continuously passed from a measured reservoir into the reaction flask as fast as taken up, maintaining the chosen pressure (about 1 inch Hg above atmospheric). In this manner the quantity of hydrogen being absorbed was readily observed at all times. In each instance the reaction was stopped when 1 mole equivalent of hydrogen had been absorbed per mole of ergosteryl acetate. The product was 5-allo-dihydroergosteryl acetate. Five runs were made, the same reagents and catalysts being employed throughout so that the results would be directly comparable. The materials and quantities thereof used, and the time required for absorption of 1 mole equivalent of hydrogen per mole of ergosteryl acetate, are given in the following table. All reactions were effected at room temperature (about 20° C.). The solvent used in each of the runs was a mixture of equal volumes of benzene and ethyl acetate and the volume given in the table is the sum of the volumes of benzene and of ethyl acetate used.

Table

| Ergosteryl Acetate (g.) | Piperidine (ml.) | Solvent (ml.) | Pd/C Catalyst, g. | Time for Reduction, hours |
| --- | --- | --- | --- | --- |
| 50 | 0 | 1,000 | 5 | 6 |
| 50 | 0 | 1,000 | 5 | 5 |
| 50 | 2.5 | 1,000 | 6 | 2¼ |
| 50 | 3.0 | 1,000 | 5 | 1½ |
| 50 | 1.0 | 1,300 | 5 | 1½ |

While the invention has been described herein with particular reference to various preferred embodiments thereof, it will be appreciated that variations from the details given herein can be effected without departing from the invention in its broadest aspects.

We claim:

1. In the palladium-catalyzed hydrogenation of 5,7-unsaturated sterols to the corresponding 5-allo-dihydrosterols, the improvement which comprises effecting said hydrogenation in the presence of an organic amine having a dissociation constant between $10^{-10}$ and $10^{-3}$ in a small but effective amount sufficient to increase the rate of hydrogenation, the said unsaturated sterol being contacted with gaseous hydrogen at a pressure in the neighborhood of atmospheric for a period of time limited to effect absorption of 1 mole equivalent of hydrogen per mole of unsaturated sterol.

2. In the palladium-catalyzed hydrogenation of 5,7-unsaturated sterols to the corresponding 5-allo-dihydrosterols, the improvement which comprises effecting said hydrogenation in the presence of piperidine in a small but effective amount sufficient to increase the rate of hydrogenation, the said unsaturated sterol being contacted with gaseous hydrogen at a pressure in the neighborhood of atmospheric for a period of time limited to effect absorption of 1 mole equivalent of hydrogen per mole of unsaturated sterol.

3. In the palladium-catalyzed hydrogenation of a 5,7-unsaturated sterol selected from the group consisting of ergosterol, 7-dehydrocholestene, 7-dehydrostigmasterol, 7-dehydrodiosgenin and 7-dehydrositosterols to the corresponding 5-allo-dihydro derivatives, the improvement which comprises effecting said hydrogenation in the presence of an organic amine having a dissociation constant between $10^{-10}$ and $10^{-3}$ in a small but effective amount sufficient to increase the rate of hydrogenation, the said unsaturated sterol being contacted with gaseous hydrogen at a pressure in the neighborhood of atmospheric for a period of time limited to effect absorption of 1 mole equivalent of hydrogen per mole of unsaturated sterol.

4. In the palladium-catalyzed hydrogenation of a 5,7-unsaturated sterol selected from the group consisting of ergosterol, 7-dehydrocholestene, 7-dehydrostigmasterol, 7-dehydrodiosgenin and 7-dehydrositosterols to the corresponding 5-allodihydro derivatives, the improvement which comprises effecting said hydrogenation in the presence of piperidine in a small but effective amount sufficient to increase the rate of hydrogenation, the said unsaturated sterol being contacted with gaseous hydrogen at a pressure in the neighborhood of atmospheric for a period of time limited to effect absorption of 1 mole equivalent of hydrogen per mole of unsaturated sterol.

5. A process which comprises forming a reaction mixture comprising a 5,7-unsaturated sterol having hydroxyl groups protected by esterification dissolved in an organic solvent therefor, a palladium on activated charcoal catalyst, and an organic amine having a dissociation constant between $10^{-10}$ and $10^{-3}$ in a small but effective amount within the range of 1 to 10 weight percent based on the sterol, and intimately contacting said reaction mixture with hydrogen gas under a pressure of from 1 to 2 atmospheres for a time only sufficient to effect absorption of 1 mole equivalent of hydrogen per mole of sterol.

6. A process according to claim 5 wherein said sterol is ergosteryl acetate.

7. A process which comprises forming a reaction mixture consisting of ergosteryl acetate, a solvent for said ergosteryl acetate, a palladium on activated charcoal hydrogenation catalyst, and a small but effective amount of piperidine sufficient to increase the rate of hydrogenation, and contacting said reaction mixture with gaseous hydrogen at a pressure in the neighborhood of atmospheric for a period of time limited to effect absorption of 1 mole equivalent of hydrogen per mole of ergosteryl acetate.

8. A process according to claim 7 wherein said solvent is a mixture of benzene and ethyl acetate.

9. A process according to claim 7 effected at room temperature.

10. A process which comprises forming a reaction mixture comprising a 5,7-unsaturated sterol selected from the group consisting of ergosterol, 7-dehydrocholestene, 7-dehydrostigmasterol, 7-dehydrodiosgenin and 7-dehydrositosterols, and in which any hydroxyl groups are protected by esterification, an organic solvent therefor, a palladium on activated charcoal catalyst, and a basic organic amine having a dissociation constant between $10^{-10}$ and $10^{-3}$ in a small but effective amount within the range of 1 to 10 weight percent based on the sterol, and intimately contacting said reaction mixture with hydrogen gas under a pressure of from 1 to 2 atmospheres and at a temperature of 15 to 50° C., and stopping the reaction when 1 mole equivalent of hydrogen per mole of sterol has been absorbed.

11. The process of claim 10 in which the reaction time is no longer than 2¼ hours.

12. The process of claim 11 in which the organic amine is piperidine.

13. A process which comprises forming a reaction mixture comprising a 5,7-unsaturated sterol, a solvent for said sterol, a palladium hydrogenation catalyst, and a small but effective amount of an organic amine having a dissociation constant between $10^{-10}$ and $10^{-3}$ sufficient to increase the rate of hydrogenation, said sterol having no nuclear unsaturation other than said 5,7-unsaturation, and contacting said reaction mixture with gaseous hydrogen at a pressure in the neighborhood of atmospheric for a period of time limited to effect absorption of 1 mole equivalent of hydrogen per mole of said sterol, thereby preparing the corresponding 5-allo-dihydro derivative.

14. The method of claim 13 in which the hydrogenation is conducted in the presence of a catalyst comprising palladium on activated charcoal and piperidine.

References Cited in the file of this patent

UNITED STATES PATENTS 2,697,106   Shepard _____ Dec. 14, 1954

FOREIGN PATENTS 456,663   Great Britain _____ 1936

OTHER REFERENCES

Annalen de chemie, vol. 554, pages 1–8 (1943).
Fieser and Fieser, "Natural Products Related To Phenanthrene," 3rd ed., 1949, page 388.